3,389,191
HYDROISOMERIZATION PROCESS WHEREIN THE CATALYST IS TREATED WITH HYDROGEN AT NON-FLOWING CONDITIONS
John H. Estes, Wappingers Falls, N.Y., assignor to Texaco Inc., New York, N.Y., a corporation of Delaware
No Drawing. Filed Nov. 17, 1964, Ser. No. 411,699
11 Claims. (Cl. 260—683.74)

ABSTRACT OF THE DISCLOSURE

A method for the hydroisomerization of normal butane in the presence of a chloride activated platinized alumina catalyst where the activity of the catalyst is enhanced and the activity after prolonged use is restored by treating the catalyst with hydrogen under non-flowing conditions at a temperature within the range of about 450 to 700° F. and at a pressure of at least 300 pounds per square inch gauge.

---

This invention relates to a hydrocarbon conversion process and more particularly to a process and catalyst for the isomerization of normal butane to isobutane. More particularly, this invention relates to the hydroisomerization of normal butane in the presence of the platinized alumina catalyst activated with an organic chloride activating agent wherein the catalyst is treated in the presence of hydrogen under non-flowing conditions at an elevated temperature to impart and maintain high catalyst activity.

Highly active isomerization catalysts prepared by the activation of a platinized alumina composite with an organic chloride activating agent are described in applications Ser. No. 102,668 and Ser. No. 102,641 both filed Apr. 13, 1961. These catalysts are prepared by chloriding a composite of platinum and alumina comprising a major portion of alumina and about 0.01 to 1.0 percent by weight platinum. The platinum is added by any of various well known methods including, for example, impregnation with a water-soluble platinum containing compound such as chloroplatinic acid, or precipitation of platinum as sulfide by passing hydrogen sulfide through an aqueous solution of a platinum compound. The platinum-alumina composite is then activated by treatment with an organic chloride activating agent for example a chloroalkane or an acid chloride, under conditions effective to react at least a portion of said activating agent with at least one component of said composite. Suitable organic chloride activating agents include, for example, carbon tetrachloride, chloroform, methylene chloride, phosgene and trichloroacetyl chloride. Carbon tetrachloride is a preferred activating agent since it not only produces a catalyst of high activity, but also provides the greatest amount of chlorine for a given weight of reagent, it is relatively inexpensive, and is easily handled. The chloride activating agent may be added in liquid form to the composite and then the mixture heated or vapors of the activating agent may be passed over the composite at activation temperatures. In the latter case, the activating agent may be employed by itself or in admixture with an inert or oxidizing gas. However, a reducing gas such as hydrogen is not used since activation is not achieved if the organic chloride is reduced to hydrogen chloride. The catalyst may be produced in pellet, granular, bead or pulverulent form to facilitate its use in fixed beds, moving beds, or fluidized solid beds as is well known in the art.

In accordance with this method of activation, the platinum-alumina composite is contacted with a chloride activating agent in an amount within the range of about 3.0 to 15.0% by weight of the platinum-alumina composite at a temperature of at least 300° F. and preferably within the range of about 300 to 650° F. The catalyst thus prepared has a high activity for the isomerization of normal butane to isobutane.

In accordance with the process of this invention, the butane isomerization activity of the chloride activated platinized alumina catalyst is enhanced and the activity after prolonged use for butane isomerization is restored by treating with hydrogen under non-flowing conditions at a temperature within the range of about 450 to 700° F. for about one to eight hours. Butane isomerization is effected at temperatures within the range of about 300 to 375° F. Maximum throughput and conversion is obtained at the higher temperatures within this range but these higher temperatures also accelerate catalyst deactivation. The preferred range for high throughput and conversion is within the range of about 315 to 350° F. Although a catalyst of high heat stability may be produced by treating at temperatures up to about 1000° F. in the presence of hydrogen chloride, this method of treatment requires special materials of construction to withstand the high temperatures and the corrosive conditions associated with the use of hydrogen chloride. It has now been found that the initial activity of platinized alumina activated with an organic chloride can be increased by treatment with hydrogen at static conditions at a temperature within the range of about 450 to 700° F. and that this same treatment may be repeated periodically to restore catalytic activity which has declined in use.

In accordance with this invention, the catalyst is heated to a temperature within the range of about 450 to 700° F. and preferably about 500° F. in the presence of an atmosphere of hydrogen maintained under non-flowing or static conditions. The hydrogen is employed at a partial pressure of at least about 300 pounds per square inch gauge and preferably at a pressure within the range of 500 to 1000 pounds per square inch gauge. This treatment is effected for a time within the range of about 60 to 480 minutes and preferably about 240 minutes. After the treating step, the pressure is reduced to an absolute pressure of less than about 15 pounds per square inch gauge preferably to about 0 pounds per square inch gauge and to a temperature less than 375° F. Hydroisomerization of butane is then initiated or resumed at butane hydroisomerization conditions. The treating step is employed initially prior to use of the catalyst for butane hydroisomerization and periodically thereafter after each 100 to 1000 hours of hydroisomerization.

The hydroisomerization of butane is effected at a reaction temperature within the range of about 350 to 375° F. preferably at about 335° F. A hydrogen to hydrocarbon mole ratio within the range of about 0.1:1 to 5:1 and preferably about 0.2:1 is employed. Hydroisomerization is effected at a pressure within the range of about 100 to 1000 pounds per square inch gauge preferably at about 500 pounds per square inch gauge. Liquid hourly space velocities within the range of about 0.5 to 8.0 volumes of oil per hour per volume of catalyst and preferably about 2.0 are employed. Hydorisomerization may be effected either with or without a promoter such as hydrogen chloride. When a promoter is used, it may be added in an amount within the range of about 0.01 to 5.0 weight percent basis butane feed.

Heretofore, the use of hydrogen in the treatment of an organic chloride activated platinized alumina has been unsuccessful since hydrogen under flowing conditions appears to strip the active chlorine from the catalyst resulting in impairment or complete deactivation of the catalyst. In accordance with this invention, hydrogen under non-flowing or static conditions is employed which prevents stripping of the chlorine from the catalyst.

Example I

A composite of platinum and alumina is prepared by pilling beta-alumina trihydrate, calcining at 930° F. for two hours, cooling to room temperature, impregnating with an aqueous solution of chloroplatinic acid and ethylene diamine, drying, and calcining at 1050° F. for two hours. The platinized alumina composite is found to comprise predominantly eta alumina containing 0.6 weight percent platinum. The composite has a surface area of 335 square meters per gram. The platinized-alumina composite is admixed with liquid carbon tetrachloride and the admixture heated in the presence of a gaseous atmosphere comprising 70% oxygen and 30% nitrogen to a temperature of 600° F. for one hour and is then cooled to room temperature. The resulting catalyst is predominantly eta alumina and contains 7.4 weight percent chlorine, and 0.6 weight percent platinum. A portion of the thus activated catalyst is contacted with normal butane and hydrogen at hydroisomerization conditions including a reaction temperature of 335° F., a pressure of 500 pounds per square inch gauge, a liquid hourly space velocity of 2.0, and a hydrogen:hydrocarbon mole ratio of 0.2:1 producing a yield of 54 weight percent isobutane basis normal butane feed.

Example II

A portion of the chloride activated catalyst of Example I is contacted with hydrogen under non-flowing conditions at 500 pounds per square inch gauge and held at 500° F. for one hour. The catalyst is then depressured to atmospheric pressure, flushed with nitrogen and cooled to 335° F. The thus treated catalyst is then employed for the hydroisomerization of normal butane at the hydroisomerization conditions of Example I and an initial yield of isobutane of 61.0 weight percent is obtained. As the catalyst is used, a slow decline in activity is observed and after 512 hours operation, the yield of isobutane is 58.7 weight percent. The butane flow is then discontinued and after all butane is flushed from the system, the hydrogen flow is stopped. The temperature is then raised to 500° F. and held at this level for one hour in the presence of hydrogen at non-flowing conditions and at a pressure of 500 pounds per square inch gauge. The pressure is then released to atmospheric and a small amount of evolved hydrogen chloride is flushed from the system with nitrogen. The catalyst is cooled to 335° F. and the flow of normal butane and hydrogen is then resumed at the foregoing hydroisomerization conditions at which time a conversion of 61.3 weight percent is observed showing complete restoration of activity. After continued operation, the catalyst activity is again observed to decline and after 360 hours, a conversion of normal butane to isobutane of 58.6 weight percent is observed. The flow of normal butane is again discontinued and after flushing all butane from the system hydrogen flow is stopped with the pressure at 500 pounds per square inch gauge and the temperature is raised to 500° for four hours. The system is then depressured, cooled to 335° F., and hydroisomerization of normal butane resumed. The activity is again found to be restored and isobutane is produced at a yield of 61.5 weight percent. After an additional 384 hours of hydroisomerization, the conversion is found to have fallen to 57.5 weight percent. A third regeneration is affected by discontinuing normal butane flow, displacing normal butane, stopping hydrogen flow at 500 pounds per square inch pressure and raising the temperature to 500° F. for four hours. The system is depressured, flushed with nitrogen, and upon resuming hydroisomerization of normal butane, a conversion of 61.7 weight percent is observed.

Example III

In a series of comparison tests employing nitrogen in place of hydrogen, a portion of the catalyst from Example I is contacted with nitrogen under non-flowing conditions at 500° F. and atmospheric pressure for one hour. The evolution of hydrogen chloride gas is observed but upon testing the catalyst for butane hydroisomerization, a conversion to 54 weight percent is observed indicating no increase in activity. Another portion of the catalyst from Example I is contacted with nitrogen at 500° F. and 500 pounds per square inch gauge for one hour. Again hydrogen chloride is evolved and upon use for butane hydroisomerization, a conversion to isobutane to 58.0 weight percent is observed. A third portion of the catalyst from Example I is contacted with nitrogen and the evolved hydrogen chloride at 1000° F. and at atmospheric pressure for two hours. The thus treated catalyst is tested for normal butane hydroisomerization and found to produce a yield of 62 weight percent isobutane.

I claim:

1. In the hydroisomerization of normal butane in the presence of a catalyst consisting essentially of platinum, alumina and chlorine wherein said chlorine is introduced into said catalyst by contacting a composite of platinum and alumina with an organic chloride activating agent selected from the group consisting of carbon tetrachloride, chloroform, methylene chloride, phosgene, and trichloroacetyl chloride at a temperature within the range of about 300 to 650° F., the improvement which comprises:

heating said catalyst to a temperature within the range of about 450 to 700° F. in contact with hydrogen at static conditions and at a pressure of at least 300 pounds per square inch gauge, then reducing said pressure to less than about 15 pounds per square inch gauge and reducing said temperature to less than 375° F., and thereafter contacting said catalyst with normal butane and hydrogen at butane hydroisomerization conditions.

2. The method of claim 1 wherein said catalyst is heated in the presence of hydrogen at static conditions for a time within the range of about 60 to 480 minutes.

3. The method of claim 1 wherein said butane hydroisomerization conditions include a reaction temperature within the range of about 315 to 375° F., a hydrogen to hydrocarbon mole ratio within the range of about 0.1:1 to 5:1, a pressure of about 100 to 1000 pounds per square inch gauge, and a liquid hourly space velocity within the range of about 0.5 to 8.0 volumes of oil per hour volume of catalyst.

4. In the hydroisomerization of normal butane in the presence of a catalyst consisting essentially of platinum, alumina and chlorine wherein said chlorine is introduced into said catalyst by contacting a composite of platinum and alumina with an organic chloride activating agent selected from the group consisting of carbon tetrachloride, chloroform, methylene chloride, phosgene, and trichloroacetyl chloride at a temperature within the range of about 300 to 650° F., the improvement which comprises:

heating said catalyst to a temperature of about 500° F. in contact with hydrogen at static conditions and at a pressure within the range of at least 500 to 1000 pounds per square inch gauge, then reducing said pressure to about 0 pound per square inch gauge and reducing said temperature to less than 375° F., and thereafter contacting said catalyst with normal butane and hydrogen at butane hydroisomerization conditions.

5. The method of claim 1 wherein said catalyst is heated in the presence of hydrogen at static conditions for a time of about 240 minutes.

6. The method of claim 1 wherein said butane hydroisomerization conditions include a reaction temperature of about 335° F., a hydrogen to hydrocarbon mole ratio within the range of about 0.1:1 to 2:1, a pressure of about 500 pounds per square inch gauge, and a liquid hourly space velocity of about 2.0 volumes of oil per hour volume of catalyst.

7. In the hydroisomerization of normal butane in the presence of a catalyst consisting essentially of platinum, alumina and chlorine wherein said chlorine is introduced into said catalyst by contacting a composite of platinum and alumina with an organic chloride activating agent selected from the group consisting of carbon tetrachloride, chloroform, methylene chloride, phosgene, and trichloroacetyl chloride at a temperature within the range of about 300 to 650° F., the improvement which comprises:

heating said catalyst in contact with hydrogen under non-flowing conditions to a temperature within the range of 450 to 700° F., cooling said catalyst to a butane hydroisomerization temperature, and thereafter contacting said catalyst with normal butane and hydrogen at butane hydroisomerization conditions.

8. In the hydroisomerization of normal butane wherein normal butane and hydrogen are contacted with a catalyst consisting essentially of platinum, alumina and chlorine wherein said chlorine is introduced into said catalyst by contacting a composite of platinum and alumina with an organic chlorine activating agent selected from the group consisting of carbon tetrachloride, chloroform, methylene chloride, phosgene, and trichloroacetyl chloride at a temperature within the range of about 300 to 650° F., a method of reactivating said catalyst which comprises:

discontinuing the contacting of normal butane with said catalyst, contacting said catalyst with an inert gas, heating said catalyst in contact with hydrogen under non-flowing conditions to a temperature within the range of 450 to 700° F., cooling said catalyst to a temperature less than 375° F., and thereafter contacting said catalyst with normal butane and hydrogen at butane hydroisomerization conditions.

9. In the hydroisomerization of normal butane wherein normal butane and hydrogen are contacted at a pressure of about 100 to 1000 pounds per square inch gauge with a catalyst consisting essentially of platinum, alumina and chlorine wherein said chlorine is introduced into said catalyst by contacting a composite of platinum and alumina with an organic chlorine activating agent selected from the group consisting of carbon tetrachloride, chloroform, methylene chloride, phosgene, and trichloroacetyl chloride at a temperature within the range of about 300 to 650° F., a method of reactivating said catalyst which comprises;

discontinuing the contacting of normal butane and hydrogen with said catalyst, reducing the pressure on said catalyst to less than 15 pounds per square inch absolute, repressuring said catalyst with hydrogen to a pressure of at least about 300 pounds per square inch gauge, heating said catalyst in contact with hydrogen under non-flowing conditions to a temperature within the range of 450 to 700° F., cooling said catalyst to a temperature less than 375° F., restoring flow of hydrogen, and contacting said catalyst with normal butane and hydrogen at butane hydroisomerization conditions.

10. The method of claim 6 wherein said reactivation is periodically repeated after each 100 to 1000 hours of hydroisomerization.

11. In the hydroisomerization of normal butane wherein normal butane and hydrogen are contacted with a catalyst consisting essentially of platinum, alumina and chlorine wherein said chlorine is introduced into said catalyst by contacting a composite of platinum and alumina with an organic chlorine activating agent selected from the group consisting of carbon tetrachloride, chloroform, methylene chloride, phosgene, and trichloroacetyl chloride at a temperature within the range of about 300 to 650° F., a method of reactivating said catalyst which comprises:

discontinuing the contacting of normal butane and hydrogen with said catalyst, contacting said catalyst with an inert gas, contacting said catalyst with organic chloride activating agent at a temperature within the range of 300 to 650° F., displacing said inert gas with hydrogen, heating said catalyst in contact with hydrogen under non-flowing conditions to a temperature within the range of 450 to 700° F., and a pressure of at least about 300 pounds per square inch gauge, cooling said catalyst to a hydroisomerization temperature, and contacting said catalyst normal butane and hydrogen at hydroisomerization conditions.

References Cited

UNITED STATES PATENTS

| | | | |
|---|---|---|---|
| 2,416,049 | 2/1947 | Foster | 252—411 X |
| 2,764,528 | 9/1956 | Sweeney | 252—411 |
| 3,242,228 | 3/1966 | Riordan et al. | 260—683.68 |
| 3,280,213 | 10/1966 | Mullen et al. | 260—683.74 |

DELBERT E. GANTZ, *Primary Examiner.*

PAUL M. COUGHLAN, JR., *Examiner.*

G. J. CRASANAKIS, R. H. SHUBERT,

*Assistant Examiners.*